United States Patent
Yamaguchi et al.

(10) Patent No.: US 12,025,210 B2
(45) Date of Patent: Jul. 2, 2024

(54) CONTINUOUSLY VARIABLE POWERTRAIN DEVICE FOR WORK VEHICLE AND WORK VEHICLE INCLUDING THE SAME

(71) Applicant: KUBOTA CORPORATION, Osaka (JP)

(72) Inventors: Tetsuo Yamaguchi, Sakai (JP); Ryoma Iwase, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/503,409

(22) Filed: Nov. 7, 2023

(65) Prior Publication Data
US 2024/0167550 A1    May 23, 2024

(30) Foreign Application Priority Data

Nov. 17, 2022   (JP) ................. 2022-184327

(51) Int. Cl.
| | |
|---|---|
| *F16H 59/68* | (2006.01) |
| *F16H 47/04* | (2006.01) |
| *F16H 59/40* | (2006.01) |
| *F16H 59/70* | (2006.01) |
| *F16H 59/72* | (2006.01) |

(Continued)

(52) U.S. Cl.
CPC ............. *F16H 47/04* (2013.01); *F16H 59/40* (2013.01); *F16H 59/70* (2013.01); *F16H 59/72* (2013.01); *F16H 61/16* (2013.01); *F16H 61/702* (2013.01); *F16H 2059/683* (2013.01); *F16H 2059/706* (2013.01)

(58) Field of Classification Search
CPC .......... F16H 47/04; F16H 59/40; F16H 59/70; F16H 59/72; F16H 61/16; F16H 61/702; F16H 2059/683; F16H 2059/706
See application file for complete search history.

(56) References Cited

U.S. PATENT DOCUMENTS

| | | |
|---|---|---|
| 2009/0005941 A1 | 1/2009 | DeMarco et al. |
| 2015/0176705 A1* | 6/2015 | Dix ...................... F16H 61/431 |
| | | 701/50 |
| 2022/0196128 A1 | 6/2022 | Yamaguchi et al. |

FOREIGN PATENT DOCUMENTS

| | | | |
|---|---|---|---|
| JP | 2017145924 A | * | 8/2017 |
| JP | 2022-096208 A | | 6/2022 |

(Continued)

OTHER PUBLICATIONS

Official Communication issued in corresponding European Patent Application No. 23207563.0, mailed on Mar. 14, 2024.

*Primary Examiner* — Justin Holmes
(74) *Attorney, Agent, or Firm* — Keating & Bennett, LLP

(57) ABSTRACT

A continuously variable powertrain device for a work vehicle includes a hydraulic static transmission to output a continuously shifted motive power while continuously varying a velocity of a motive power received from an engine, a planetary transmission to receive the motive power from the engine and the continuously shifted motive power and to output a compound motive power, a pressure detector to detect a hydraulic pressure in a closed circuit of the hydraulic static transmission, a planetary clutch mechanism to switch a shift level of the planetary transmission, and a powertrain controller to control actuation of the hydraulic static transmission and the planetary transmission based on a shift command.

5 Claims, 10 Drawing Sheets

(51) Int. Cl.
*F16H 61/16* (2006.01)
*F16H 61/70* (2006.01)

(56) References Cited

FOREIGN PATENT DOCUMENTS

| KR | 101936448 B1 * | 1/2019 | | |
| WO | WO-2010041479 A1 * | 4/2010 | ............. | F16H 47/04 |

* cited by examiner

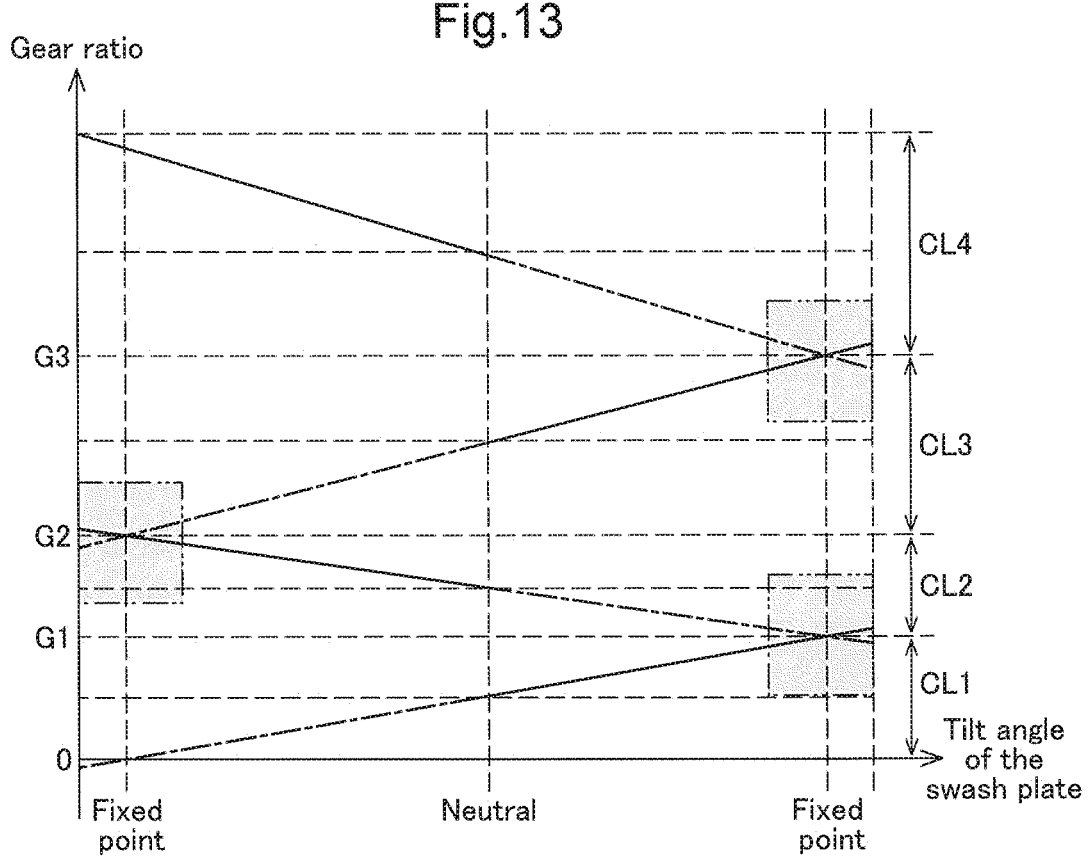

CONTINUOUSLY VARIABLE POWERTRAIN DEVICE FOR WORK VEHICLE AND WORK VEHICLE INCLUDING THE SAME

CROSS REFERENCE TO RELATED APPLICATIONS

This application claims the benefit of priority to Japanese Patent Application No. 2022-184327 filed on Nov. 17, 2022. The entire contents of this application are hereby incorporated herein by reference.

BACKGROUND OF THE INVENTION

1. Field of the Invention

The present invention relates to a continuously variable powertrain device for a work vehicle and a work vehicle including the same.

2. Description of the Related Art

A powertrain which transmits a motive power from an engine to front wheels and rear wheels is disclosed in Japanese Patent Application Publication JP2022-96208A. In this powertrain, the motive power from the engine is branched to a hydraulic pump of a hydraulic static transmission (HST) and a planetary transmission. The planetary transmission receives a continuously shifted motive power from a hydraulic motor of the HST and the motive power from the engine. An output motive power from the planetary transmission is transmitted to a travel device. The planetary transmission has a plurality of shift levels switchable by a planetary clutch mechanism. The shift level is changed from a previous shift level to a next shift level in response to a vehicle speed going outside of a speed range of the previous shift level, in a vehicle speed control utilizing tilting of a swash plate of the HST. A switching point from the previous shift level to the next shift level is a fixed value predetermined by design. In the continuously variable powertrain device according to JP2022-96208A, the shift level is changed to the next shift level when a value of the vehicle speed driven with the previous shift level is accelerated or decelerated to the fixed value. However, when the shift level is changed to the next shift level at the fixed value in a state in which a volumetric efficiency of the HST is varied due to a change of an internal pressure in a closed circuit of the HST to which a workload or the like applies, a value of the speed originally planned does not appear and a large switching shock occurs.

SUMMARY OF THE INVENTION

A preferred embodiment of the present invention provides a continuously shifted motive power for a work vehicle to reduce or prevent switching shock due to a workload or the like when a planetary transmission is switched from a previous shift level to a next shift level.

A continuously variable powertrain device, for a work vehicle, to transmit a motive power from an engine to a travel device, the continuously variable powertrain device includes a hydraulic static transmission to output a continuously shifted motive power while continuously varying a velocity of the motive power received from the engine, a planetary transmission to receive the motive power from the engine and the continuously shifted motive power and to output a compound motive power, a pressure detector to detect a hydraulic pressure in a closed circuit of the hydraulic static transmission, a planetary clutch mechanism to switch a shift level of the planetary transmission, and a powertrain controller to control actuation of the hydraulic static transmission and the planetary transmission based on a shift command, the powertrain controller being configured or programmed to function as a continuously variable speed controller to generate a shift control signal to control adjustment of a ratio of the hydraulic static transmission, a planetary clutch controller to generate a clutch control signal to control switching of the shift level of the planetary transmission, and a switching timing changer to change, based on the velocity of the motive power transmitted to the travel device and on the hydraulic pressure detected by pressure detector, a switching timing of the shift level to be switched by the planetary clutch controller.

According to this configuration, the switching timing to switch the shift level from a previous shift level to a next shift level is determined in real time based on a travel velocity of the motive power transmitted to the travel device and the detected hydraulic pressure in the closed circuit of the hydraulic static transmission, and is not a fixed value. That is, the shift level is switched based on a shift environment in each time. Therefore, a switching shock due to the workload or the like which would otherwise occur when switching planetary transmission is switched from the previous shift level to the next shift level, is reduced or prevented.

In a preferred embodiment of the present invention, the switching timing changer is configured or programmed to provide threshold characteristics to the switching timing, the threshold characteristics being different between a case of switching the shift level from a first side to a second side and a case of switching the shift level from the second side to the first side, and to reduce switching the shift level to a previous shift level immediately after switching the shift level from the previous shift level to a next shift level.

The switching timing determined based on the travel speed (the velocity of the motive power transmitted to the travel device) and the detected hydraulic pressure is taken as a switching point to change the shift level. However, near this switching point, an unstable output of the hydraulic static transmission may result in an unstable travel speed and a problem of repetition (contact bounce and chattering) of switching clutches of the planetary clutch mechanism. Providing the threshold to the switching timing prevents the repetition of switching clutches of the planetary clutch mechanism which would otherwise occur even when the travel speed is in slightly unstable. Particularly, it is preferred that the switching timing is provided with the threshold characteristics which have different thresholds between a case of switching the shift level from the first side to the second side and a case of switching the shift level from the second side to the first side, that is, which have a first threshold to switch the shift level from the first side to the second side and a second threshold to switch shift level from the second side to the first side.

In a preferred embodiment of the present invention, the switching timing changer is configured or programmed to include a shift timing table to calculate the switching timing from at least the detected hydraulic pressure.

In a case that the shift timing table is based on various formulas to calculate switching timing and the formulas are defined by various shift conditions by a shift-up environment and a shift-down environment, selecting an optimum shift timing table (switching timing calculation formula) from a plurality of shift timing tables is able to obtain an ideal switching point.

In a preferred embodiment of the present invention, the switching timing changer is configured or programmed to calculate the switching timing from the detected hydraulic pressure, an oil temperature in the closed circuit, and a current shift level of the planetary transmission, based on the shift timing table.

For example, the unstable output of the hydraulic static transmission occurs due to a fluid temperature in the closed circuit, the detected hydraulic pressure which is a differential pressure (an effective pressure) between a high-pressure side and a low-pressure side in the closed circuit, an engine rotation speed, or the like. The shift timing table is generated base on an experiment with an actual machine, a simulation result with a simulator, or the like.

A preferred embodiment of the present invention provides a work vehicle including the continuously variable powertrain device. The work vehicle also acts and effects as same as the continuously variable powertrain device.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 13 is a diagram indicative of a clutch switching process including areas indicative of a threshold characteristics in which areas thresholds differ between a case of switching the shift level from a first side to a second side and a case of switching the shift level from the second side to the first side.

FIG. 14 is a numerical table indicative of numerals identifying the threshold characteristics with different thresholds between a case of switching the shift level from a first side to a second side and a case of switching the shift level from the second side to the first side.

DETAILED DESCRIPTION OF THE PREFERRED EMBODIMENTS

Preferred embodiments of the present invention will be described with reference to the drawings showing a tractor as an example of a work vehicle. Note that an arrow "F" in FIG. 1 is defined as a front side corresponding to a front-back direction relative to a body of the work vehicle, an arrow "B" in FIG. 1 is defined as a back side corresponding to the front-back direction relative to the body, an arrow "U" in FIG. 1 is defined as an upper side corresponding to a vertical direction relative to the body, an arrow "D" in FIG. 1 is defined as a lower side corresponding to the vertical direction relative to the body, a near side on the sheet of FIG. 1 is defined as a left side corresponding to a left-right direction relative to the body, and a far side on the sheet of FIG. 1 is defined as a right side corresponding to the left-right direction relative to the body throughout the description below.

Figure 1:
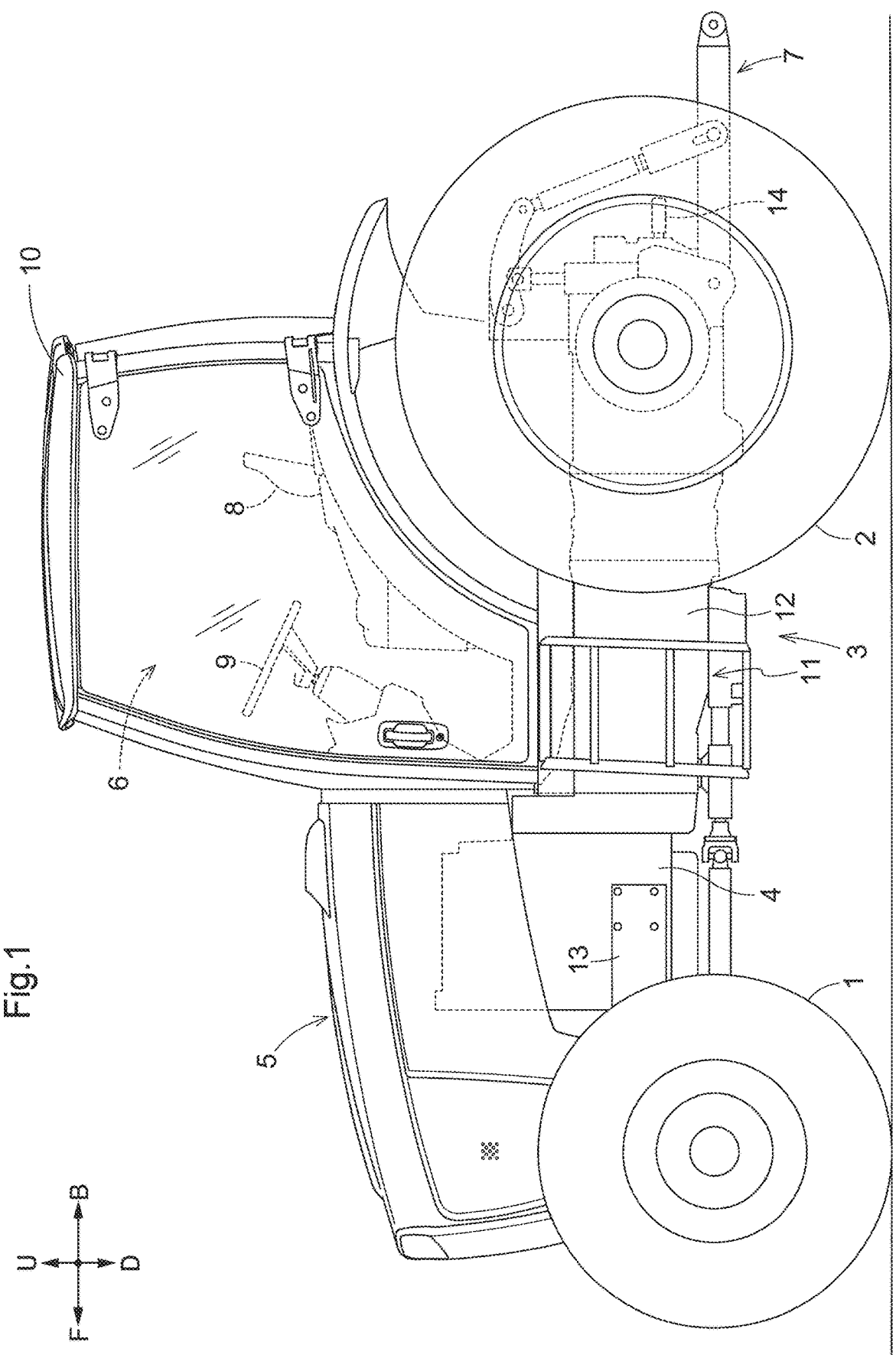
FIG. 1 is a side view of a tractor.

FIG. 1 shows a tractor. This tractor includes a pair of left and right drivable and steerable front wheels 1, a pair of left and right drivable rear wheels 2 and a travel body 3. The travel body 3 is supported by the pair of front wheels 1 and the pair of rear wheels 2. The travel body 3 includes a motive power portion 5 in a front portion thereof. The motive power portion 5 includes an engine 4. The travel body 3 includes a driver's section 6 and a link mechanism 7 in a rear portion thereof. An operator boards the driver's section 6 to perform an operation. The link mechanism 7 connects with a work device such as a rotary cultivator in such a manner that the work device can be lifted or lowered. The driver's section 6 includes a driver's seat 8, a steering wheel 9 to perform a steering operation of the front wheels 1 and a cabin 10 which covers a boarding space. A body frame 11 of the travel body 3 includes the engine 4, a transmission case 12 and a front wheels holder frame 13. A rear portion of the engine 4 is connected with the front portion of the transmission case 12. A bottom portion of the engine 4 is connected with the front wheels holder frame 13. The transmission case 12 is provided with a power take-off shaft 14 in a rear portion thereof. The power take-off shaft 14 transmits a motive power from the engine 4 to the work device connected with the tractor by the link mechanism 7. The front wheels 1 and the rear wheels 2 are unlimited examples of a "travel device".

Figure 2:
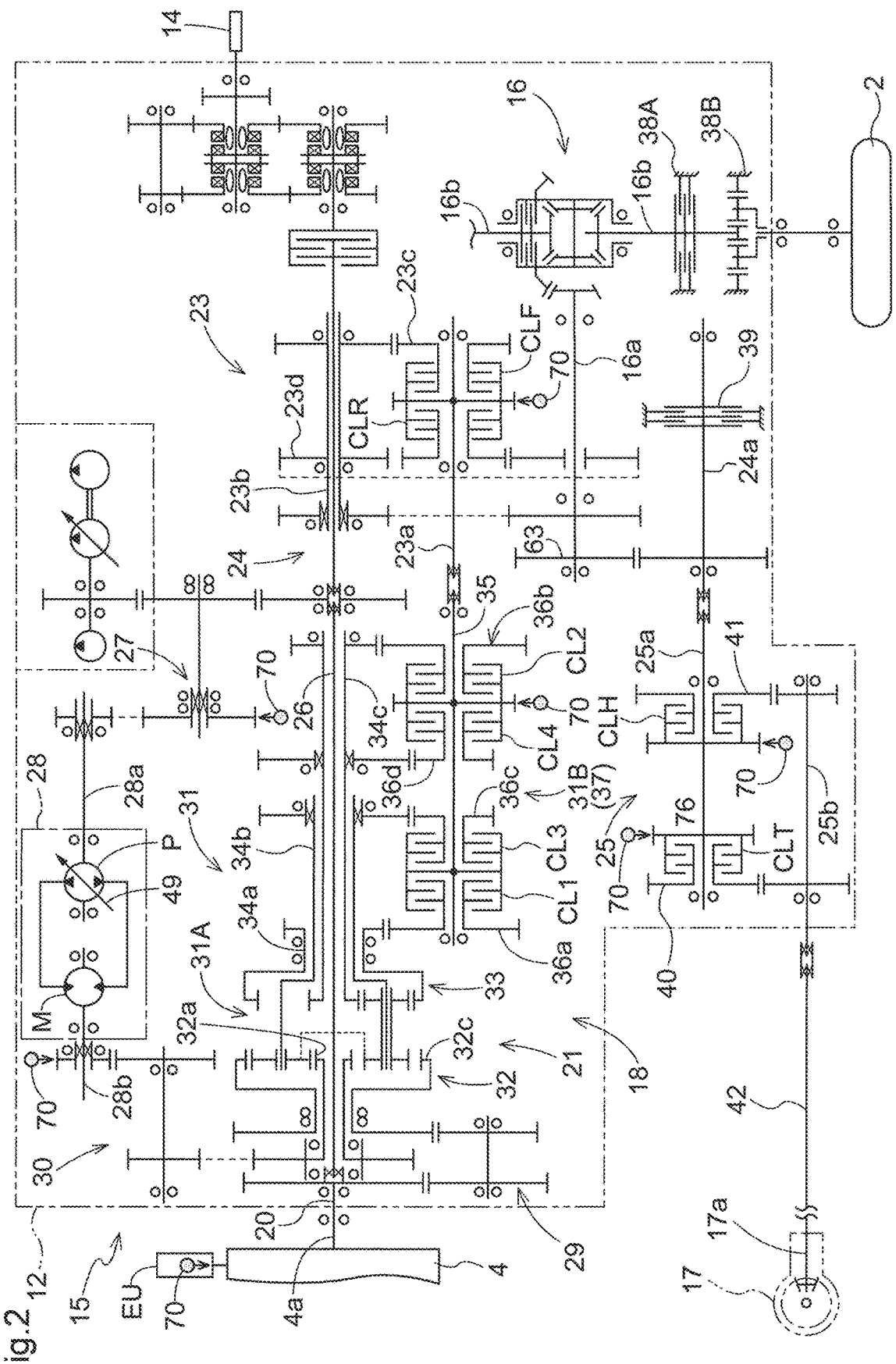
FIG. 2 is a schematic diagram of a continuously variable powertrain device.

As shown in FIG. 2, a powertrain device 15 for travel transmits the motive power from the engine 4 to the front wheels 1 and the rear wheels 2. The powertrain device 15 includes a transmission 18. The transmission 18 transmits the motive power from the engine 4 to a rear wheels differential mechanism 16 and a front wheels differential mechanism 17 while varying a velocity of the motive power. The transmission 18 is housed in the transmission case 12.

As shown in FIG. 2, the transmission 18 includes an input shaft 20, a main transmission portion 21, a forward-reverse direction switch 23, a gear mechanism 24 and a front wheels transmission portion 25. The input shaft 20 is disposed in a front portion of the transmission case 12. The motive power from an output shaft 4a of the engine 4 is transmitted to the input shaft 20. The main transmission portion 21 outputs the motive power from the input shaft 20 to the forward-reverse direction switch 23 while varying the velocity of the motive power. The gear mechanism 24 transmits the motive power from the forward-reverse direction switch 23 to an input shaft 16a of the rear wheels differential mechanism 16. The front wheels transmission portion 25 outputs the motive power from the forward-reverse direction switch 23 to the front wheels differential mechanism 17 while varying the velocity of the motive power.

As shown in FIG. 2, the main transmission portion 21 includes a hydraulic static transmission 28 (HST 28), a planetary transmission 31 and a planetary clutch mechanism 37. The HST 28 receives the motive power from the input shaft 20. The planetary transmission 31 receives the motive power from the input shaft 20 and a continuously shifted motive power output from the HST 28. The planetary clutch mechanism 37 is configured to switch a shift level of the planetary transmission 31.

As shown in FIG. 2, the HST 28 includes a variable capacity hydraulic pump P and a hydraulic motor M driven by a hydraulic fluid from the hydraulic pump P. A rear end portion of the input shaft 20 is connected with a rotation shaft 26. A rear end portion of the rotation shaft 26 is connected with a first gear mechanism 27. The hydraulic pump P is connected with a pump shaft 28a as an input shaft. The pump shaft 28a and the input shaft 20 are connected with each other via the first gear mechanism 27. The HST 28 is configured to change the motive power from the input shaft 20 to either a forward motive power or a reverse motive power by changing an angle of a swash plate Psp of the hydraulic pump P and to vary a rotation speed of either the forward motive power or the reverse motive power. The hydraulic motor M is connected with a motor shaft 28b as an output shaft. The motor shaft 28b of the HST 28 outputs the continuously shifted motive power.

The planetary transmission includes a planetary gearshift portion 31A. The planetary gearshift portion 31A receives the motive power from the input shaft 20 and the continuously shifted motive power from the HST 28. The planetary clutch mechanism 37 which functions as an output portion 31B of the planetary transmission 31 outputs the motive power from the planetary gearshift portion 31A while dividing the motive power into speed ranges of four shift levels.

Figure 3:
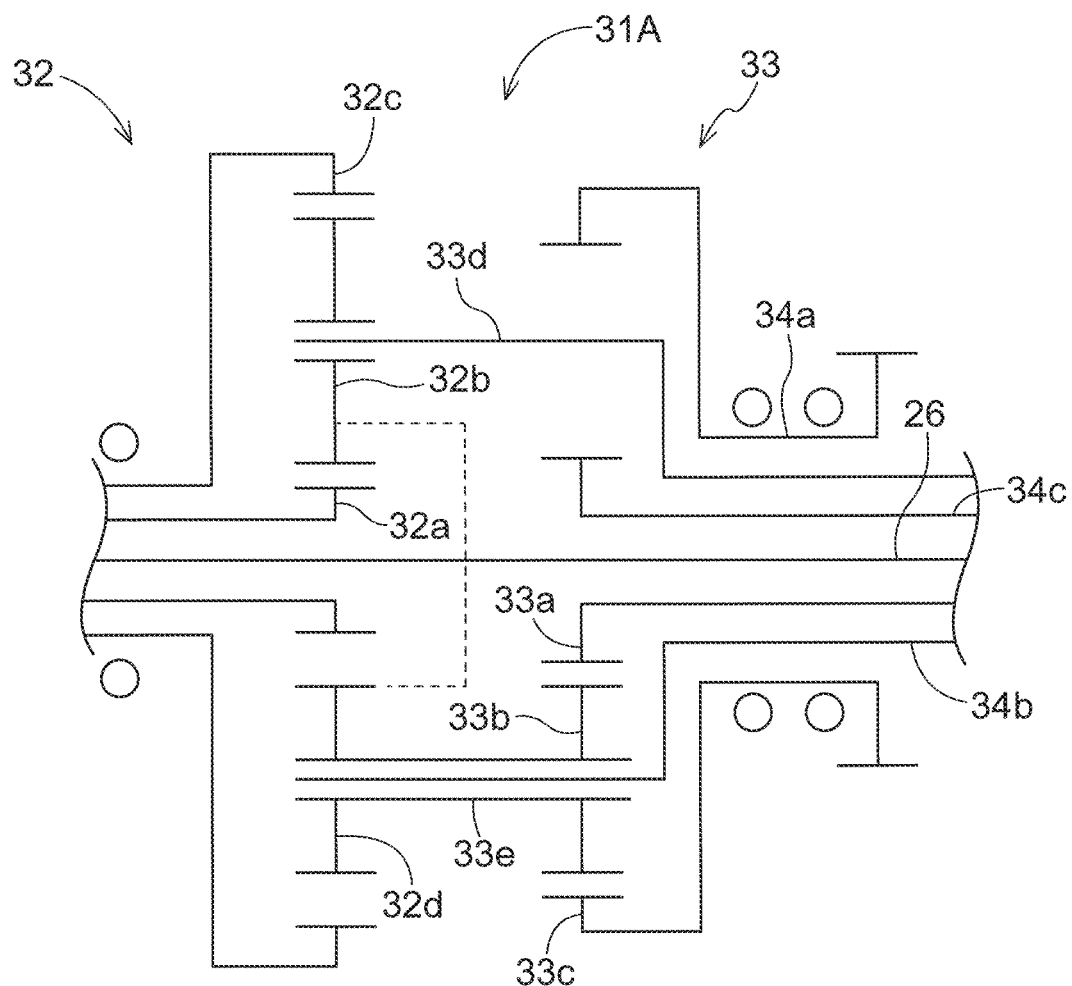
FIG. 3 is a schematic diagram of a planetary transmission.

As shown in FIGS. 2 and 3, the planetary gearshift portion 31A includes a first gearshift portion 32 and a second gearshift portion 33 positioned on a rear side of the first gearshift portion 32. The first gearshift portion 32 includes a first sun gear 32a, a first planetary gear 32b and a first ring gear 32c. The first planetary gear 32b meshes with the first sun gear 32a. The first ring gear 32c has inner teeth which mesh with the first planetary gear 32b. The second gearshift portion 33 includes a second sun gear 33a, a second planetary gear 33b, a second ring gear 33c and a second carrier 33d. The second planetary gear 33b meshes with the second sun gear 33a. The second ring gear 33c has inner teeth which mesh with the second planetary gear 33b. The second carrier 33d holds the second planetary gear 33b.

As shown in FIG. 2, a second gear mechanism 30 is in a space between the first sun gear 32a and the motor shaft 28b of the HST 28. The first sun gear 32a receives the continuously shifted motive power from the HST 28 through the second gear mechanism 30. A third gear mechanism 29 is in a space between the first ring gear 32c and the input shaft 20. The first ring gear 32c receives the motive power from the input shaft 20 through the third gear mechanism 29. As shown in FIGS. 2 and 3, the first gearshift portion 32 includes an interlocking gear 32d. The interlocking gear 32d meshes with the first planetary gear 32b. The interlocking gear 32d and the second planetary gear 33b are interlocked and connected with each other by a coupler member 33e. The first gearshift portion 32 and the second gearshift portion 33 are in a configuration of a what is called a compound planetary powertrain.

As shown in FIG. 2, the planetary clutch mechanism 37 includes a first input shaft 34a, a second input shaft 34b, a third input shaft 34c and an output shaft 35. The first input shaft 34a, the second input shaft 34b and the third input shaft 34c are in a configuration of a triple-layered shaft structure. The output shaft 35 is positioned in parallel with the first input shaft 34a, the second input shaft 34b and the third input shaft 34c. As shown in FIG. 3, the first input shaft 34a is connected with the second ring gear 33c. The second input shaft 34b is connected with the second carrier 33d. The third input shaft 34c is connected with the second sun gear 33a. The first input shaft 34a is connected with a first range gear mechanism 36a. A first clutch CL1 is at a position between the first range gear mechanism 36a and the output shaft 35. A second range gear mechanism 36b is connected with the third input shaft 34c. A second clutch CL2 is at a position between the second range gear mechanism 36b and the output shaft 35. A third range gear mechanism 36c is connected with the second input shaft 34b. A third clutch CL3 is at a position between the third range gear mechanism 36c and the output shaft 35. A fourth range gear mechanism 36d is connected with the third input shaft 34c. A fourth clutch CL4 is at a position between the fourth range gear mechanism 36d and the output shaft 35. Each of the first clutch CL1, the second clutch CL2, the third clutch CL3 and the fourth clutch CL4 is a hydraulic clutch and switchable between an engaged state to transmit the motive power and a disengaged state to block the motive power.

In the main transmission portion 21, the hydraulic pump P of the HST 28 receives the motive power from the engine 4 through the input shaft 20, the rotation shaft 26 and the first gear mechanism 27. The motive power received from the hydraulic pump P is changed to the continuously shifted motive power in either a clockwise direction or a counter-clockwise direction while the rotation speed being varied by the HST 28. The motor shaft 28b outputs the continuously shifted motive power. The first sun gear 32a of the first gearshift portion 32 receives the continuously shifted motive power from the HST 28 through the second gear mechanism 30. The first ring gear 32c of the first gearshift portion 32 receives the motive power from the engine 4 through the input shaft 20 and the third gear mechanism 29. The continuously shifted motive power from the HST 28 and the motive power from the engine 4 are combined into a compound motive power by the first gearshift portion 32 of the planetary gearshift portion 31A and the second gearshift portion 33. The compound motive power is transmitted from the second gearshift portion 33 to the output portion 31B (the planetary clutch mechanism 37). The output shaft 35 outputs the compound motive power.

The first input shaft 34a of the output portion 31B receives the compound motive power generated by the planetary gearshift portion 31A from the second ring gear 33c. The output shaft 35 outputs the compound motive power with a first gear range through the first range gear mechanism 36a and the first clutch CL1 of the output portion 31B in a case of the first clutch CL1 engaged.

The third input shaft 34c of the output portion 31B receives the compound motive power generated by the planetary gearshift portion 31A from the second sun gear 33a. The output shaft 35 outputs the compound motive power with a second gear range through the second range gear mechanism 36b and the second clutch CL2 of the output portion 31B in a case of the second clutch CL2 engaged.

The second input shaft 34b of the output portion 31B receives the compound motive power generated by the planetary gearshift portion 31A from the second carrier 33d. The output shaft 35 outputs the compound motive power with a third gear range through the third range gear mechanism 36c and the third clutch CL3 of the output portion 31B in a case of the third clutch CL3 engaged.

The output shaft 35 outputs the compound motive power with a fourth gear range through the fourth range gear mechanism 36d and the fourth clutch CL4 of the output portion 31B in a case of the fourth clutch CL4 engaged.

As shown in FIG. 2, the forward-reverse direction switch 23 includes an input shaft 23a and an output shaft 23b. The input shaft 23a is connected with the output shaft 35 of the planetary transmission 31. The output shaft 23b is disposed in parallel with the input shaft 23a. The input shaft 23a is connected with a forward travel clutch CLF and a reverse travel clutch CLR. A forward travel gear interlocking mechanism 23c is disposed at a position between the forward travel clutch CLF and the output shaft 23b. A reverse travel gear interlocking mechanism 23d is disposed at a position between the reverse travel clutch CLR and the output shaft 23b. Each of the forward travel clutch CLF and the reverse travel clutch CLR is a hydraulic clutch and switchable between an engaged state to transmit the motive power and a disengaged state to block the motive power.

In a case of the forward travel clutch CLF engaged, the input shaft 23a and the forward travel gear interlocking mechanism 23c are interlocked with each other and the motive power from the input shaft 23a is transmitted to the output shaft 23b through the forward travel gear interlocking mechanism 23c. This enables the output shaft 23b to output a forward travel motive power. In a case of the reverse travel clutch CLR engaged, the input shaft 23a and the reverse travel gear interlocking mechanism 23d are interlocked with each other and the motive power from the input shaft 23a is transmitted to the output shaft 23b through the reverse travel gear interlocking mechanism 23d. This enables the output shaft 23b to output a reverse travel motive power.

The input shaft 23a of the forward-reverse direction switch 23 receives the compound motive power from the planetary transmission 31. When the forward travel clutch CLF is operated to be engaged, the compound motive power from the input shaft 23a is changed to the forward travel motive power by the forward travel clutch CLF and the forward travel gear interlocking mechanism 23c, and the forward travel motive power is transmitted to the output shaft 23b.

When the reverse travel clutch CLR is operated to be engaged, the compound motive power from the input shaft 23a is changed to the reverse travel motive power by the reverse travel clutch CLR and the reverse travel gear interlocking mechanism 23d, and the reverse travel motive power is transmitted to the output shaft 23b. The forward travel motive power and the reverse travel motive power are transmitted from the output shaft 23b to the rear wheels differential mechanism 16 and the front wheels transmission portion 25 through the gear mechanism 24.

In the rear wheels differential mechanism 16, left and right output shafts 16b receive either the forward travel motive power or reverse travel motive power from the forward-reverse direction switch 23 and transmit the received motive power to the left and right rear wheels 2. The left rear wheel 2 receives the motive power from the left output shaft 16b through a planetary reduction mechanism 38B. The left output shaft 16b is provided with a steering brake 38A. Not shown in diagrams, the transmitting system between the right output shaft 16b and the right rear wheel 2 is also provided with the planetary reduction mechanism 38B and the steering brake 38A, in the same manner as in the transmitting system between the left output shaft 16b and the left rear wheel 2.

As shown in FIG. 2, the front wheels transmission portion 25 includes an input shaft 25a and an output shaft 25b. The input shaft 25a is connected with an output shaft 24a of the gear mechanism 24. The output shaft 25b is positioned in parallel with the input shaft 25a. The input shaft 25a is connected with a speed equalizing clutch CLT and an accelerating clutch CLH. The accelerating clutch CLH is disposed on a rear side of the speed equalizing clutch CLT. Each of the speed equalizing clutch CLT and the accelerating clutch CLH is switchable between an engaged state to transmit the motive power and a disengaged state to block the motive power. A speed equalizing gear mechanism 40 is disposed in a space between the speed equalizing clutch CLT and the output shaft 25b. An accelerating gear mechanism 41 is disposed in a space between the accelerating clutch CLH and the output shaft 25b. The output shaft 24a of the gear mechanism 24 is provided with a parking brake 39.

The motive power from the input shaft 25a is transmitted to the output shaft 25b through the speed equalizing clutch CLT and the speed equalizing gear mechanism 40 in a case of the accelerating clutch CLH engaged. In this case, the speed equalizing gear mechanism 40 causes a speed equalization state in which a circumferential velocity of the front wheels 1 is identical to a circumferential velocity of the rear wheels 2, and the output shaft 25b outputs the motive power to the front wheels 1 under the speed equalization state.

The motive power from the input shaft 25a is transmitted to the output shaft 25b through the accelerating clutch CLH and the accelerating gear mechanism 41 in a case of the accelerating clutch CLH engaged. In this case, the accelerating gear mechanism 41 causes an acceleration state in which the circumferential velocity of the front wheels 1 is faster than the circumferential velocity of the rear wheels 2, and the output shaft 25b outputs the motive power to the front wheels 1 under the acceleration state.

The rotation shaft 42 connects the output shaft 25b with an input shaft 17a of the front wheels differential mechanism 17. The front wheels differential mechanism 17 receives the motive power from the output shaft 25b through the rotation shaft 42.

When the speed equalizing clutch CLT is operated to be engaged, the front wheels 1 and the rear wheels 2 are driven in a state in which the average circumferential velocity of the front wheels 1 is identical with the average circumferential velocity of the rear wheels 2. When the accelerating clutch CLH is operated to be engaged, the front wheels 1 and the rear wheels 2 are driven in a state in which the average circumferential velocity of the front wheels 1 is faster than the average circumferential velocity of the rear wheels 2. Therefore, a turning radius for a turning travel of the travel body 3 in a case of the accelerating clutch CLH engaged is smaller than a turning radius for the turning travel in a case of the speed equalizing clutch CLT engaged.

The powertrain device 15 is provided with a rotation detector group 70. The rotation detector group 70 is configured to detect an engine rotation speed, a continuously variable rotation speed, a composite rotation speed and a travel rotation speed. The engine rotation speed is a rotation velocity of the motive power by the engine 4. The continuously variable rotation speed is a rotation speed of the continuously shifted motive power by the HST 28. The composite rotation speed is a rotation speed of the compound motive power by the planetary transmission 31. The travel rotation speed is a rotation speed of either the forward travel motive power or the reverse travel motive power by the forward-reverse direction switch 23. The rotation detector group 70 includes a plurality of rotation detectors disposed at several positions, which rotation detectors includes an engine rotation detector to detect the engine rotation speed, a continuously variable rotation detector to detect the continuously variable rotation speed, a composite rotation detector to detect the composite rotation speed and a travel rotation detector to detect the travel rotation speed.

Figure 4:
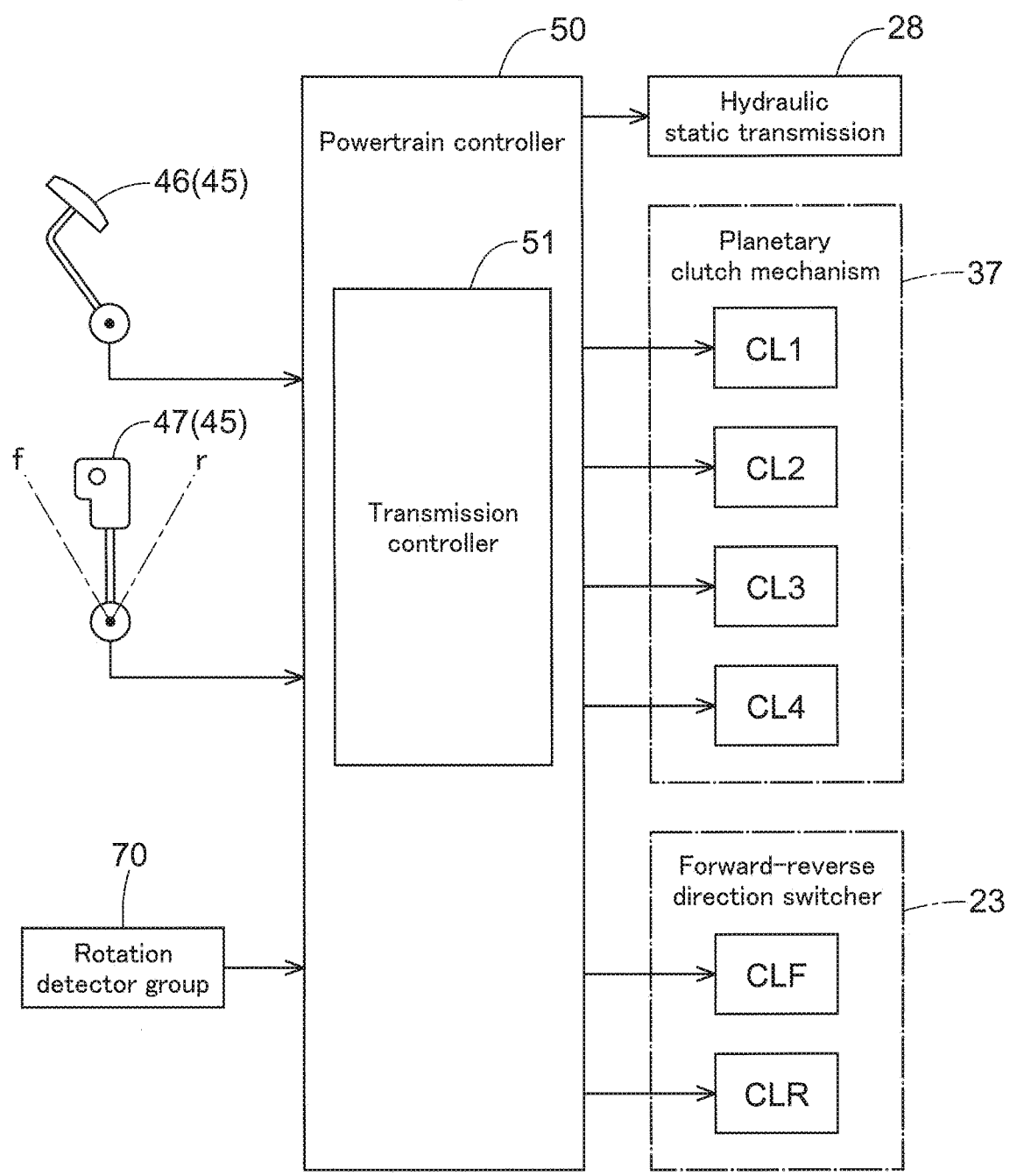
FIG. 4 is a block diagram indicative of input/output devices around a powertrain controller.
Figure 5:
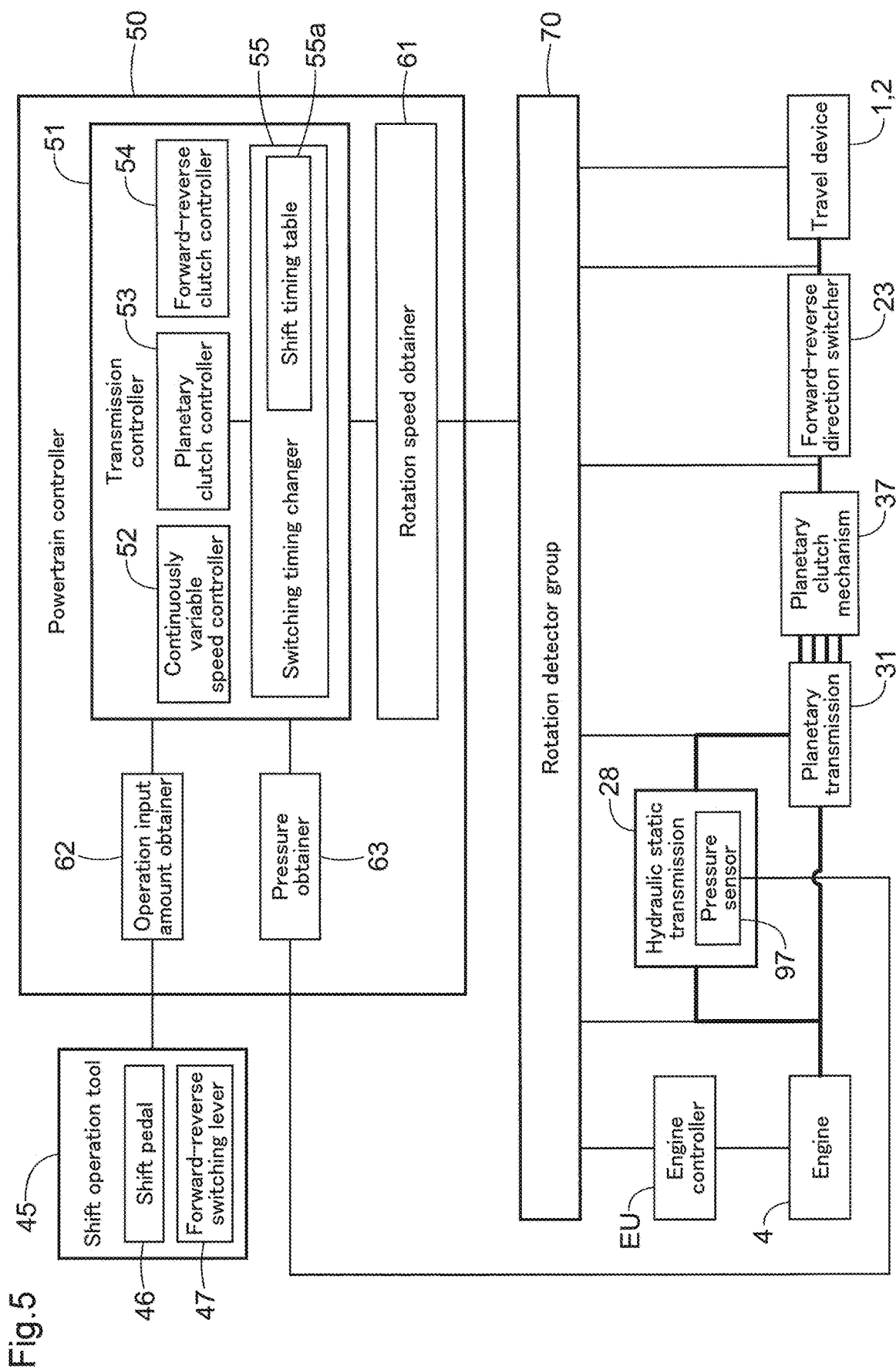
FIG. 5 is a block diagram indicative of control function of the continuously variable powertrain device.

The powertrain controller 50 shown in FIGS. 4 and 5 is configured or programmed to perform a shift control of the continuously variable powertrain device in this preferred embodiment. The driver's section 6 is provided with a shift operation tool 45 including a shift pedal 46 and a forward/reverse switching lever 47. The operator performs a shift operation with the shift pedal 46 and the forward/reverse switching lever 47. The powertrain controller 50 receives respective operation amounts of the shift pedal 46 and the forward/reverse switching lever 47 as shift command. The powertrain controller 50 also receives a detection signal (the rotation speed) from the rotation detector group 70. The powertrain controller 50 is configured or programmed to generate a control signal to control actuation of the hydraulic systems such as the HST 28, the planetary clutch mechanism 37, and the forward-reverse direction switch 23.

Figure 6:
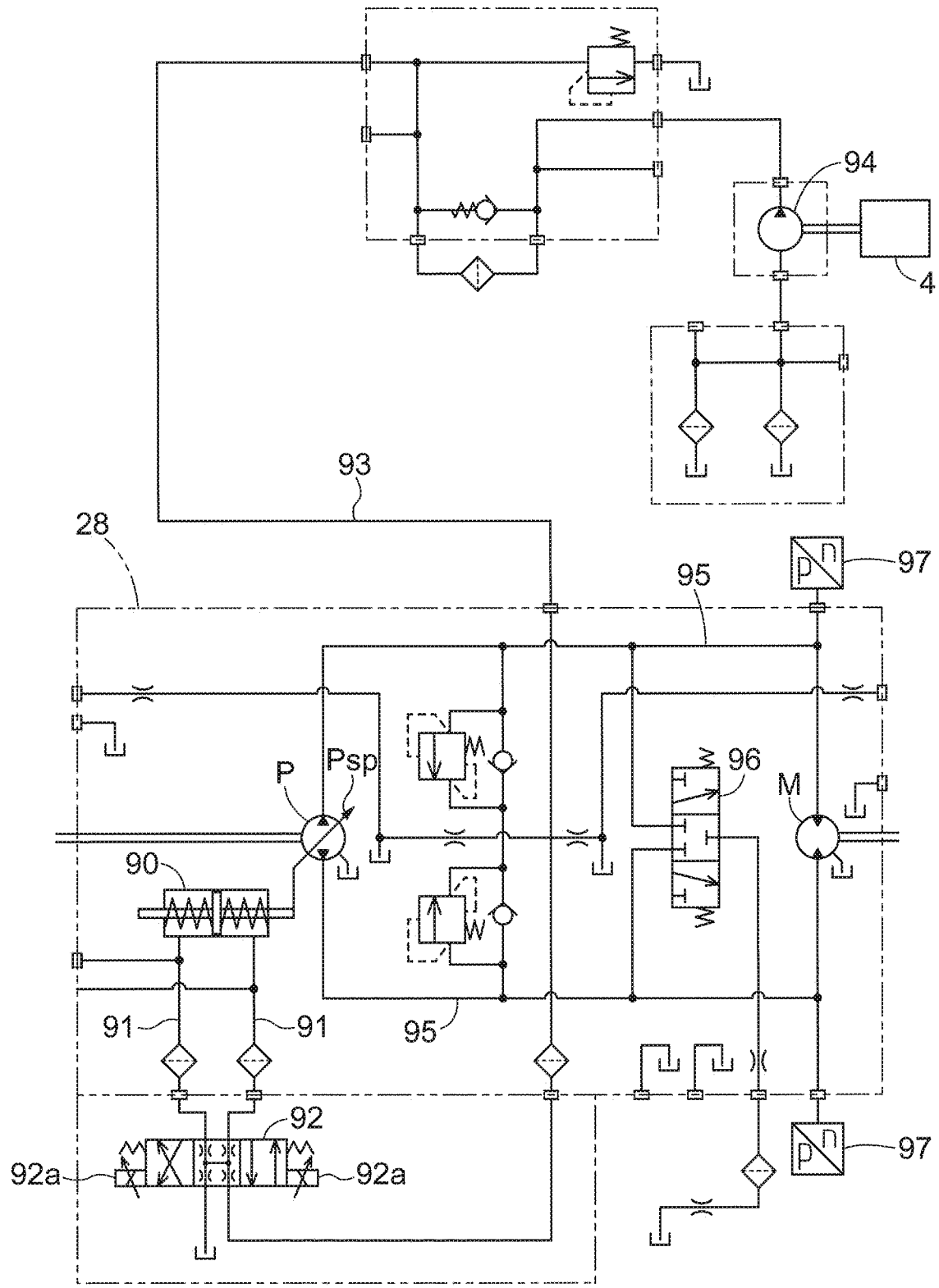
FIG. 6 is a hydraulic circuit of a hydraulic static transmission and an operation structure of the hydraulic static transmission.

FIG. 6 shows a hydraulic circuit of the HST 28. The swash plate Psp of the hydraulic pump P of the HST 28 is connected with a hydraulic cylinder 90. A shift operation valve 92 is connected with the hydraulic cylinder 90 via an operation fluid path 91. The shift operation valve 92 is connected with a hydraulic pump 94 via a supply path 93. A hydraulic fluid pressurized by the hydraulic pump 94 is supplied to either of two fluid chambers of the hydraulic cylinder 90 in accordance with a switching of a port by the shift operation valve 92, thereby actuating the hydraulic cylinder 90. In a case that the supply of the hydraulic fluid to the hydraulic cylinder 90 is cut-off, the position of the hydraulic cylinder 90 is held. The HST 28 is configured to swing the swash plate Psp in a clockwise direction or a counterclockwise direction in accordance with the switching of a port by the shift operation valve 92. The swing of the swash plate Psp enables the continuously variable transmission of the HST 28. The shift operation valve 92 is an electromagnetic pilot valve, for example. The powertrain controller 50 is configured or programmed to control actuation of a solenoid valve 92a of the shift operation valve 92. A closed circuit 95 connects the hydraulic pump P with the hydraulic motor M. A relief valve 96 is connected with the closed circuit 95. Furthermore, a first fluid path and a second fluid path each included in the closed circuit 95 are provided with a pressure sensor 97. The pressure sensor 97 detects a hydraulic pressure in the closed circuit 95. A differential pressure between a hydraulic pressure in the first fluid path and a hydraulic pressure in the second fluid path is an effective pressure obtained from a measured value of the pressure sensor 97. The pressure sensor 97 is an unlimited example of a "pressure detector".

As shown in FIG. 5, the powertrain controller 50 includes a transmission controller 51, a rotation speed obtainer 61, an operation input amount obtainer 62 and a pressure obtainer 63.

The transmission controller 51 is configured or programmed to define or function as a continuously variable speed controller 52, a planetary clutch controller 53, a forward-reverse clutch controller 54 and a switching timing changer 55. The continuously variable speed controller 52 is configured or programmed to generate a control signal to control adjustment of an angle of the swash plate Psp of the HST 28. The planetary clutch controller 53 is configured or programmed to generate a clutch control signal to control switching of the shift level of the planetary transmission 31. Specifically, the planetary clutch controller 53 is configured or programmed to generate a clutch control signal controlling engagement/disengagement of the clutches (the first clutch CL1, the second clutch CL2, the third clutch CL3 and the fourth clutch CL4) of the planetary clutch mechanism 37. The forward-reverse clutch controller 54 is configured or programmed to generate a clutch control signal controlling engagement/disengagement of the clutches (the forward travel clutch CLF and the reverse travel clutch CLR) of the forward-reverse direction switch 23. The switching timing changer 55 is configured or programmed to change a switching timing of the shift level to be switched by the planetary clutch controller 53 (switching timing of the hydraulic clutch), based on the velocities of the front wheels 1 and the rear wheels 2 (travel speed, or travel rotation speed), on the hydraulic pressure detected by the pressure sensor 97 (specifically the effective pressure of the HST 28), or the like. The switching timing changer 55 is configured or programmed to include a shift timing table 55a to calculate the switching timing from at least the detected hydraulic pressure.

The rotation speed obtainer 61 is configured or programmed to receive the detection signal from the rotation detector group 70, to calculate the engine rotation speed, the continuously variable rotation speed, the composite rotation speed, and the travel rotation speed, and to output the above calculated rotation speeds to the transmission controller 51. Note that "rotation speed" and "velocity" has the same meaning. The operation input amount obtainer 62 is configured or programmed to receive an operation signal from the shift operation tool 45 such as the shift pedal 46, and the forward/reverse switching lever 47, to convert to the shift operation amount and to output the shift operation amount to the transmission controller 51. The pressure obtainer 63 is configured or programmed to receive the detection signal from the pressure sensor 97, to calculate the respective hydraulic pressures in the first fluid path and the second fluid path, to calculate the differential pressure between these hydraulic pressures and to output the above calculated pressures to the transmission controller 51.

Figure 7:
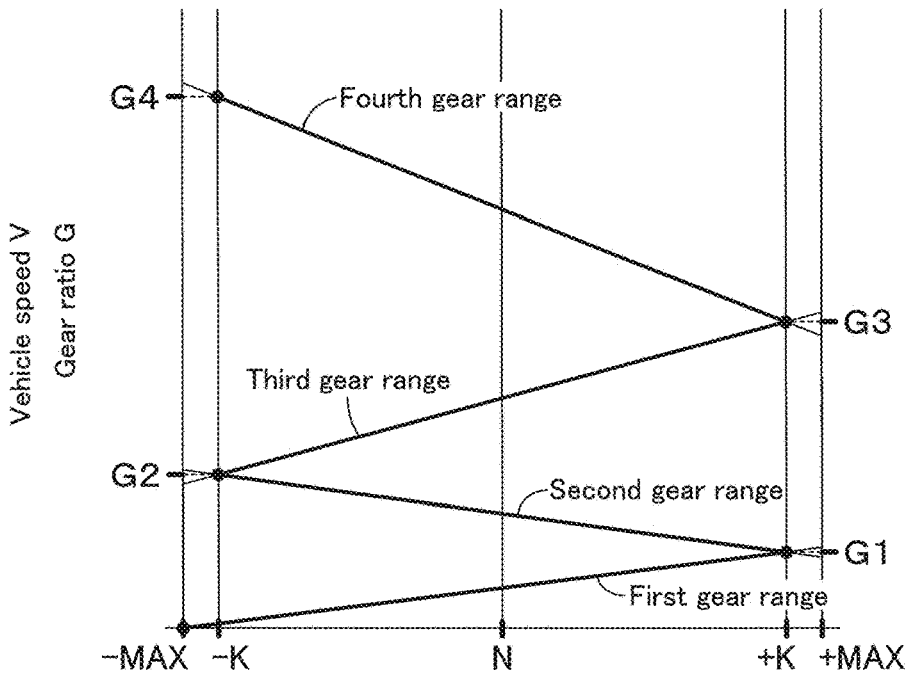
FIG. 7 is an explanatory diagram of a gearshift by the powertrain controller.

FIG. 7 shows an explanatory diagram of changing the speed by the transmission controller 51. A vertical axis in FIG. 7 indicates a gear ratio G. The gear ratio G is a ratio of the travel rotation speed to the engine rotation speed (the travel rotation speed/the engine rotation speed). The travel rotation speed (the travel speed and the vehicle speed) is the rotation speed of the input shaft 16a. Note that the vertical axis in FIG. 7 also indicates the travel rotation speed (the vehicle speed) V of the input shaft 16a because the gear ratio G corresponds to the travel rotation speed (the vehicle speed). A horizontal axis in FIG. 7 indicates a degree of inclination (tilt angle) of the swash plate Psp of the hydraulic pump P of the HST 28, which is a shift state of the HST 28. [N] indicates a neutral state of the HST 28. [−MAX] indicates the shift state outputting the reverse motive power with a maximum speed. [+MAX] indicates the shift state outputting the forward motive power with a maximum speed. [−K] indicates a shift state to switch of the clutch from a reverse direction to a forward direction, being near the position of [−MAX] on the side of [N]. [+K] indicates a shift state to switch of the clutch from the forward direction to the reverse direction, being near the position of [+MAX] on the side of [N]. [G1], [G2], [G3] and [G4] indicate respective predetermined gear ratios G. The transmission controller 51 is configured or programmed to control change of the travel rotation speed (the vehicle speed) V of the input shaft 16a while switching the respective engagement/disengagement of the first clutch CL1, the second clutch CL2, the third clutch CL3 and the fourth clutch CL4 based on the gear ratio G and the shift state of the HST 28.

That is, in a state of the first clutch CL1 engaged, the travel rotation speed (the vehicle speed) V is continuously accelerated from zero with the first gear range in response to the HST 28 shifted from [−MAX] to [+MAX]. When the HST 28 is shifted to [+K] and the gear ratio G is accelerated to [G1], the transmission controller 51 switches the first clutch CL1 to a disengaged state and the second clutch CL2 to an engaged state. In a state of the second clutch CL2 engaged, the travel rotation speed (the vehicle speed) V is continuously accelerated with the second gear range in response to the HST 28 shifted from [+MAX] to [−MAX]. When the HST 28 is shifted to [−K] and the gear ratio G is accelerated to [G2], the transmission controller 51 switches the second clutch CL2 to a disengaged state and the third clutch CL3 to an engaged state. In a state of the third clutch CL3 engaged, the travel rotation speed (the vehicle speed) V is continuously accelerated with the third gear range in response to the HST 28 shifted from [−MAX] to [+MAX]. When the HST 28 is shifted to [+K] and the gear ratio G is accelerated to [G3], the transmission controller 51 switches the third clutch CL3 to a disengaged state and the fourth clutch CL4 to an engaged state. In a state of the fourth clutch CL4 engaged, the travel rotation speed (the vehicle speed) V is continuously accelerated with the fourth gear range in response to the HST 28 shifted from [+MAX] to [−MAX].

A switching timing of the clutch of the planetary clutch mechanism 37 (clutch switching timing, or clutch switching point in other words) by the planetary clutch controller 53 and the switching timing changer 55 will be described with reference to FIGS. 8 to 11. Although the planetary clutch mechanism 37 includes four planetary clutches, FIGS. 8 to 11 indicate the switching between the first clutch CL1 and the second clutch CL2 only.

Figure 8:
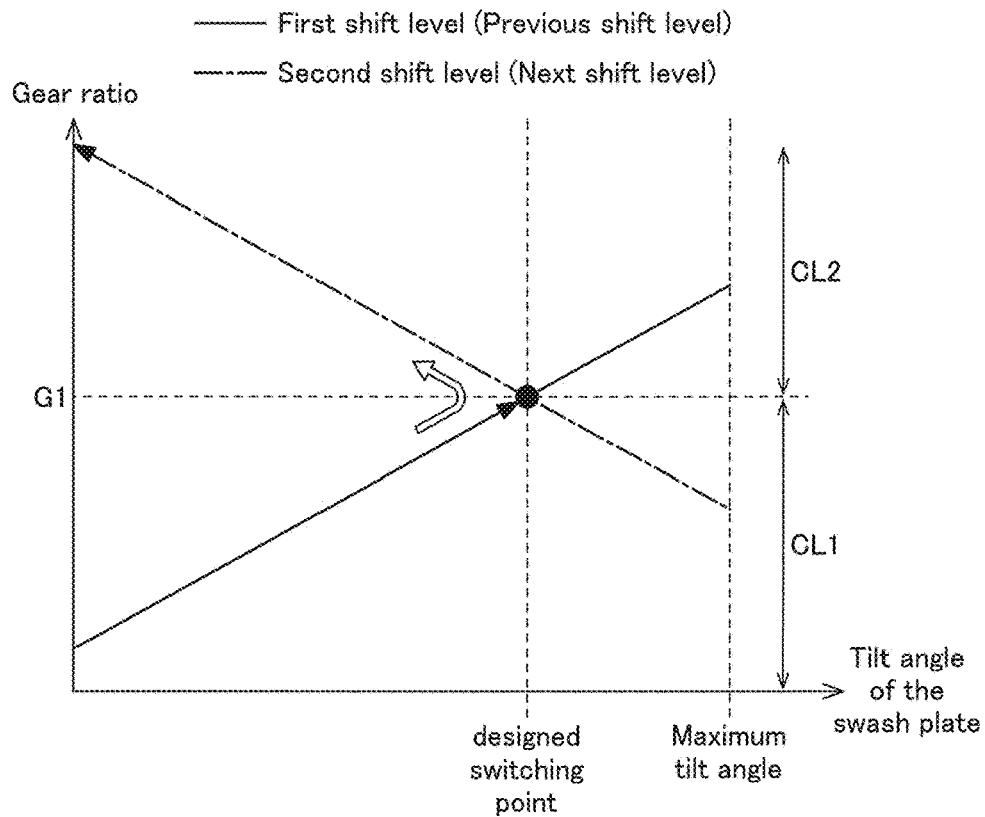
FIG. 8 is a diagram indicative of a clutch switching process.

FIG. 8 shows an ideal process of switching of the engagement from the first clutch CL1 to the second clutch CL2. A designed clutch switching timing (designed switching point, a prefixed point or a predetermined point) is predetermined at a point [+K] where the gear ratio G (the vehicle speed) is to be [G1]. If no load is on the HST 28, when the clutches are switched from the first clutch CL1 to the second clutch CL2 at the designed switching point [+K], the gear ratio G (the vehicle speed) is continuously accelerated from the first shift level to the second shift level, and a smooth shift change is realized.

Figure 9:
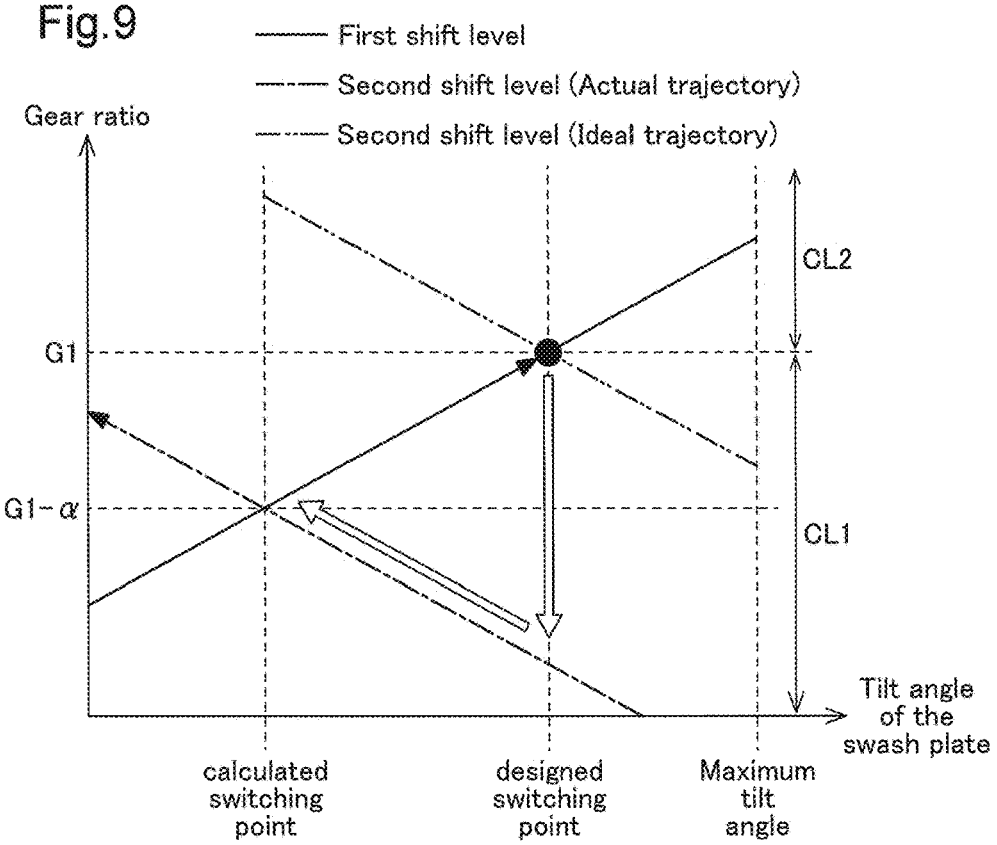
FIG. 9 is a diagram indicative of a clutch switching process.

The HST 28 is hardly driven with no load when the work vehicle is traveling. A volumetric efficiency of the HST 28 is varied in a case of the HST 28 loaded. Therefore, as shown in FIG. 9, when the HST 28 is shifted to the designed switching point [+K] and then the clutches are switched at the timing of gear ratio G (the vehicle speed) being [G1], the gear ratio G is discontinuously lowered from a line of the ideal second shift level to a line of the actual second shift level and then is accelerated, as shown by outlined white arrows in FIG. 9. [G1−α] in FIG. 9 means a value lower than [G1]" by a value of [α]. This means that the gear ratio G (the vehicle speed) is discontinuously changed at a timing of switching from the first shift level to the second shift level and results in an uncomfortable shift change.

Figure 10:
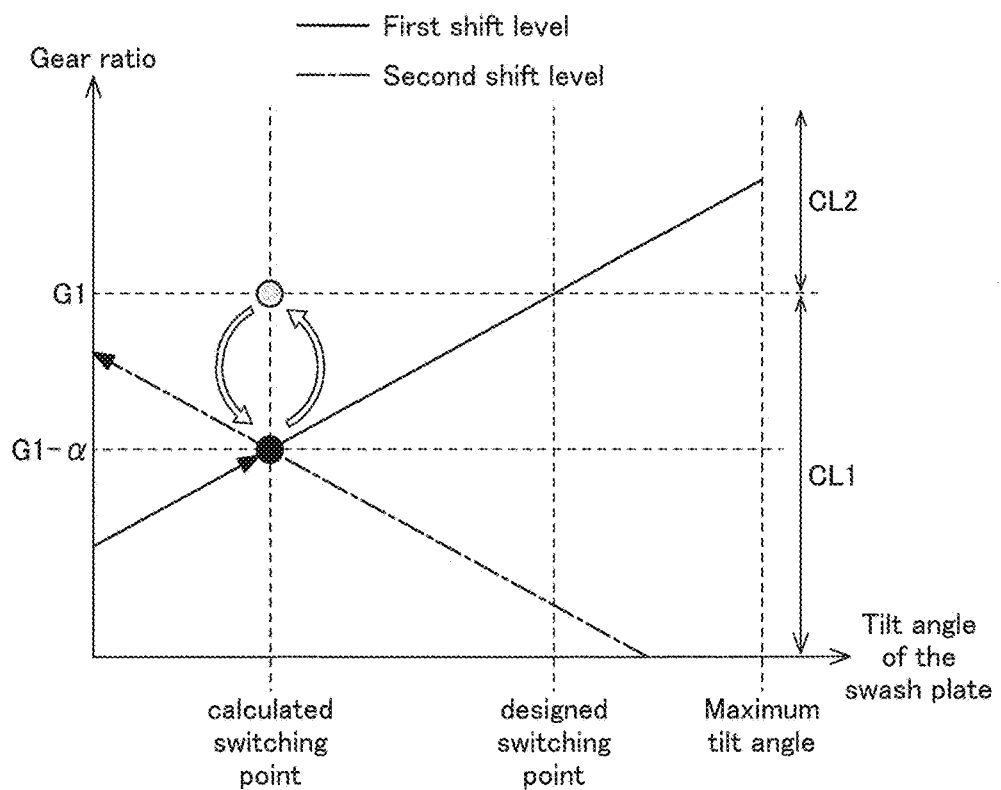
FIG. 10 is a diagram indicative of a clutch switching process.
Figure 11:
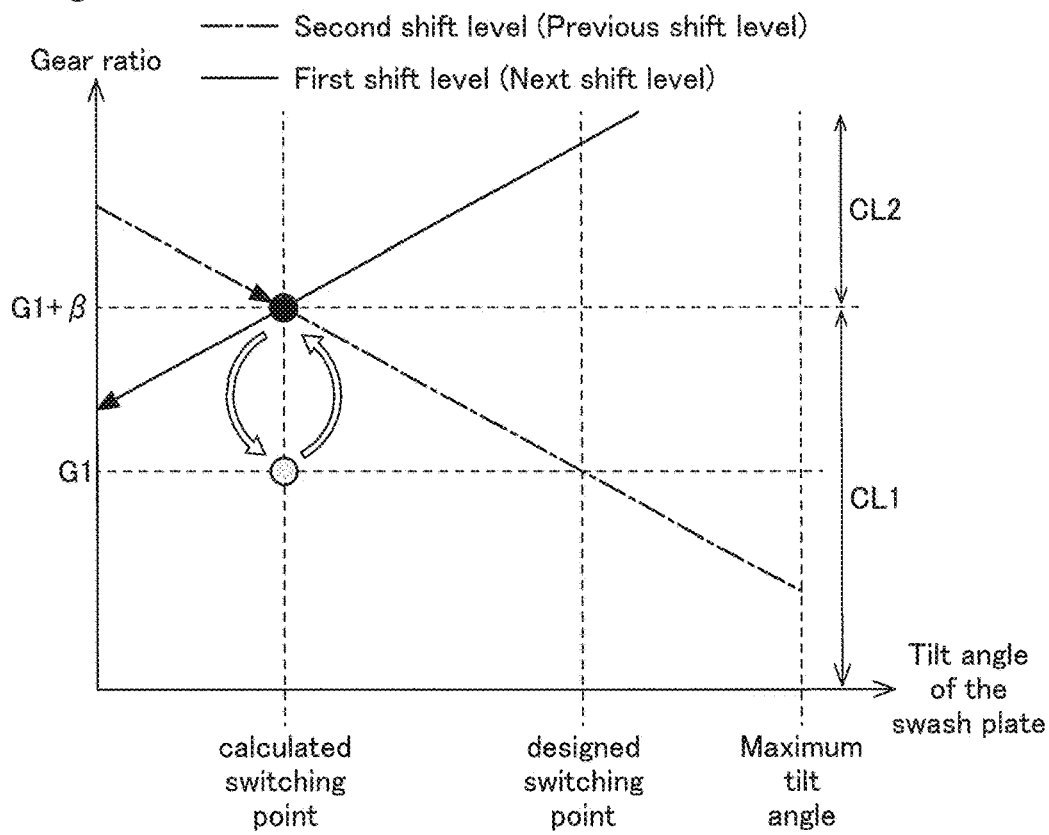
FIG. 11 is a diagram indicative of a clutch switching process.

In order to resolve this problem, the switching timing changer 55 is configured or programmed to calculate the clutch switching timing (calculated switching point) based on the effective pressure of the HST 28. Then, the planetary clutch controller 53 switches the clutches with the calculated clutch switching timing. Specifically, as shown in FIG. 10, the time taken for the gear ratio G (the vehicle speed) to return to [G1], due to a duration of a double engagement by the clutches, is shortened, by switching the clutches at the calculated switching point at which the respective gear ratios G (the vehicle speeds) before and after the clutch switching become as equal as possible, and a smooth shift change is realized. FIG. 10 shows a shift-up process. FIG. 11 shows a shift-down process. As shown in FIG. 11, in the shift-down process, switching the clutches at the calculated switching point realizes a substantially smooth deceleration. [G1−α] in FIG. 10 means a value of the gear ratio G lower than [G1] by a value of [α]. [G1+β] in FIG. 10 means a value of the gear ratio G greater than [G1] by a value of [β].

Figure 12:
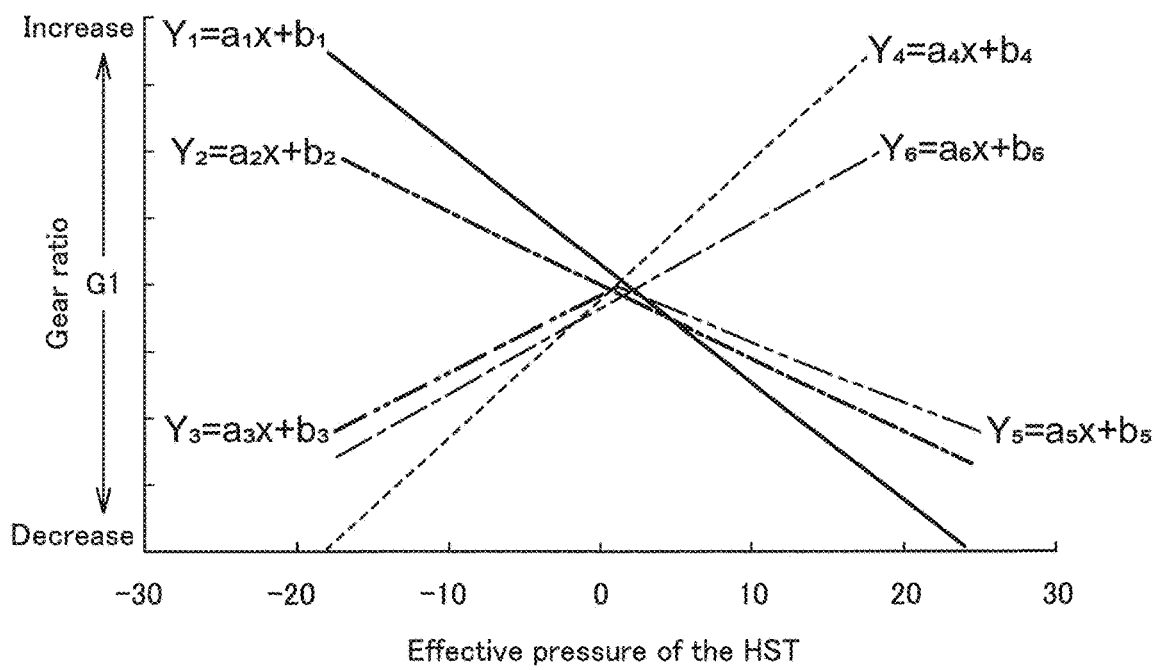
FIG. 12 is a diagram indicative of a graph group showing formulas to switch timing calculation operations as a basis of a shift timing table.

For calculating an optimized clutch switching timing, an oil temperature of the HST 28, the effective pressure of the HST 28, the engine rotation speed, a previous shift level and a next shift level are taken as input parameters. It is preferred to install a look-up table which is a program structure outputting a suitable clutch switching timing in response to the input parameters. The shift timing table 55a is used as the look-up table. As an example, as shown in FIG. 12, the shift timing table 55a may be generated based on a plurality of relational formulas. The relational formula between the effective pressure of the HST 28 and the gear ratio G is generated based on a simulation or the like. The plurality of relational formulas are generated while selecting values of each of the input parameters. Although the relational formulas are indicated as first order formulas, the relational formulas may be quadratic formulas or any other multidimensional polynomial formulas.

The switching timing changer 55 is configured or programmed to output threshold characteristics which take different values between the shift-up process and the shift-down process, to avoid a repetition (contact bounce and chattering) of the switching of the clutches at the clutch switching point and thereabound. In other words, the switching timing changer 55 is configured or programmed to provide the threshold characteristics to the switching timing, the threshold characteristics being different between a case of switching the shift level from a first side to a second side and a case of switching the shift level from the second side to the first side. In this preferred embodiment, a first threshold value is provided with the threshold characteristic in a case that the gear ratio G (the vehicle speeds) changes from an upper side to a lower side, and a second threshold value is provided with the threshold characteristic in a case that the gear ratio G (the vehicle speeds) changes from the lower side to the upper side. It is possible to realize a control behavior like what is called a hysteresis comparator by this way. An example of a process of the clutch switching with the threshold characteristics is described hereinafter with reference to FIGS. 13 and 14. Gray areas in square in FIG. 13 indicates areas in which the clutch switching is affected by the threshold characteristics. FIG. 13 indicates the threshold characteristics with the shift-up process. The threshold characteristics with the shift-down process may be identical with (or similar to) the threshold characteristics with the shift-up process. Constant values α1, α2, α3, β1, β2, β3, γ1, γ2 and γ3 which indicate the gear ratio G (the vehicle speed) in FIG. 14 are determined by experiment, experience and design.

(i) In a case that a target gear ratio (a target vehicle speed) and a current gear ratio (a current vehicle speed) is much lower than [G1] (the target gear ratio is set to a first value), the switching timing changer 55 is configured or programmed to calculate a value (a second value greater than the first value) slightly lower than [G1] as the clutch switching point based on the effective pressure of the HST 28.

(ii) In a case that the target gear ratio obtained by the operation input amount obtainer 62 is changed to a value (a third value) greater than [G1] exceeding the calculated clutch switching point, the target gear ratio is set to the second value, the clutches are switched from the first clutch CL1 to the second clutch CL2, and the second value is recorded as the switching point where the clutches have been actually switched from the first clutch CL1 to the second clutch CL2.

(iii) The switching timing changer 55 is configured or programmed to calculate a fourth value greater than the third value as a shift-down clutch switching point after finishing the switching of clutches.

(iv) However, an upper limit value of the threshold characteristics (gray areas in square in FIG. 13) is [G1+α1] as indicated in a table shown in FIG. 14, and the target gear ratio has been the third value. Therefore, the shift-down switching point is overwritten with the second value which has been previously recorded.

(v) As a result, a shift-down clutch switching is not performed, and the current gear ratio is held at the third value because the target gear ratio has been the third value and the shift-down switching point has been the second value lower than the third value.

(vi) After that, when the target gear ratio exceeds [G1+α1] which is the upper limit value of the threshold characteristics, overwriting of the shift-down switching point with the second value as described in the above item (iv) is not performed any more. This means that the shift-down switching point is set to the fourth value which is lower than the upper limit value [G1+α1]. This results in that the shift-down clutch switching is performed at a timing of the target gear ratio fallen below the fourth value.

(vii) In a case that the target gear ratio became a fifth value lower than the second value without exceeding [G1+α1] after finishing the process described above (iv), the clutches are switched from the second clutch CL2 to the first clutch CL1 at a timing of the target gear ratio fallen below the second value which is the overwritten shift-down switching point, and the second value is recorded as the switching point where the clutches have been actually switched from the second clutch CL2 to the first clutch CL1.

(viii) Next, it is assumed that a shift-up clutch switching point would be set to a sixth value lower than the fifth value after finishing the switching of the clutches from the first clutch CL1 to the second clutch CL2.

(ix) A lower limit value of the threshold characteristics (gray areas in square in FIG. 13) is [G1−α2] as indicated in a table shown in FIG. 14. Therefore, in a case that the target gear ratio has been the fifth value greater than [G1−α2], the shift-up switching point is overwritten with the second value which has been previously recorded.

(x) Subsequently, it is determined whether or not the shift-up switching point and the shift-down switching point are to be overwritten, depending on the target gear ratio going out of the area of the threshold characteristics or returning to the previous shift level without going out of the area of the threshold characteristics as described above. The switching of the clutches is performed based on the shift-up switching point and the shift-down switching point.

The above example is a clutch switching process that the shift level is immediately returned to the previous shift level. In a case of a usual acceleration and a usual deceleration, the target gear ratio and the current gear ratio pass through the threshold characteristics within a predetermined time. Therefore, a probability of maintaining a control behavior in the above-described threshold characteristics is rare.

Other Preferred Embodiments

The present invention is not limited to the configuration illustrated in the above preferred embodiments. Other representative preferred embodiments of the present invention will be described below.

A type and a position of the rotation detectors of the rotation detector group 70 is not limited to the above-described preferred embodiments. Any kind of the rotation detectors capable of detecting the substantially identical rotation speed with the above-described preferred embodiments are applicable. The rotation detectors may be positioned anywhere at which it is capable of detecting the substantially identical rotation speed with the above-described preferred embodiments.

A function of the powertrain controller 50 may be integrated with other functions and may be divided into a plurality of functions. A specified control function may be provided for in a control unit (ECU) other than the powertrain controller 50.

With the above-described configuration in this preferred embodiment, the planetary transmission 31 is configured to divide the motive power into four shift levels. The shift levels divided by the planetary transmission 31 may be less than four shift levels or more than four shift levels.

With the above-described configuration in this preferred embodiment, the travel device includes the front wheels 1 and the rear wheels 2. The travel device may include crawlers or a combination of wheels and semi-crawlers.

With the above-described configuration in this preferred embodiment, the shift operation tool 45 includes the shift pedal 46. The shift operation tool 45 may include a shift lever instead of (or other than) the shift pedal 46.

With the above-described configuration in this preferred embodiment, the shift operation tool 45 includes the forward/reverse switching lever 47. The shift operation tool 45 may include a forward/reverse switching pedal instead of (or other than) the forward/reverse switching lever 47.

The switching timing changer 55 is configured or programmed to include a shift timing table 55a to calculate the switching timing from at least the detected hydraulic pressure. A plurality of the shift timing tables 55a may be provided for fitting to kinds of the work vehicle and characteristics of operators and may be optionally selected.

Note that the configurations disclosed in the above preferred embodiments (including other preferred embodiments; the same applies to the following) may be combined with configurations disclosed in other preferred embodiments, as long as no contradiction arises. The preferred embodiments disclosed herein are illustrative. Preferred embodiments of the present invention are not limited thereto and can be altered without departing from the object of the present invention.

Preferred embodiments of the present invention are applicable to a continuously variable powertrain device, for a work vehicle, including a hydraulic static transmission, and a planetary transmission and to various work vehicles including the continuously variable powertrain device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A continuously variable powertrain device, for a work vehicle, to transmit a motive power from an engine to a travel device, the continuously variable powertrain device comprising:
- a hydraulic static transmission to output a continuously shifted motive power while continuously varying a velocity of the motive power received from the engine;
- a planetary transmission to receive the motive power from the engine and the continuously shifted motive power and to output a compound motive power;
- a pressure detector to detect a hydraulic pressure in a closed circuit of the hydraulic static transmission;
- a planetary clutch mechanism to switch a shift level of the planetary transmission; and
- a powertrain controller to control actuation of the hydraulic static transmission and the planetary transmission based on a shift command, the powertrain controller being configured or programmed to function as:
- a continuously variable speed controller to generate a shift control signal to control adjustment of a ratio of the hydraulic static transmission;
- a planetary clutch controller to generate a clutch control signal to control switching of the shift level of the planetary transmission; and
- a switching timing changer to change, based on the velocity of the motive power transmitted to the travel device and on the hydraulic pressure detected by pressure detector, a switching timing of the shift level to be switched by the planetary clutch controller.

2. The continuously variable powertrain device according to claim 1, wherein
the switching timing changer is configured or programmed to provide threshold characteristics to the switching timing, the threshold characteristics being different between a case of switching the shift level from a first side to a second side and a case of switching the shift level from the second side to the first side, and to prevent switching the shift level to a previous shift level immediately after switching the shift level from the previous shift level to a next shift level.

3. The continuously variable powertrain device according to claim 1, wherein the switching timing changer is configured or programmed to include a shift timing table to calculate the switching timing from at least the detected hydraulic pressure.

4. The continuously variable powertrain device according to claim 3, wherein the switching timing changer is configured or programmed to calculate the switching timing from the detected hydraulic pressure, an oil temperature in the closed circuit, and a current shift level of the planetary transmission, based on the shift timing table.

5. A work vehicle comprising the continuously variable powertrain device according to claim 1.

* * * * *